US008364668B2

(12) United States Patent
Khaliq et al.

(10) Patent No.: US 8,364,668 B2
(45) Date of Patent: Jan. 29, 2013

(54) USER INTERFACES FOR A DOCUMENT SEARCH ENGINE

(75) Inventors: Siraj Khaliq, San Francisco, CA (US);
Joe Sriver, Mountain View, CA (US);
Frederick G. M. Roeber, San Francisco, CA (US); William Brougher, Menlo Park, CA (US); Adam Smith, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1721 days.

(21) Appl. No.: 10/952,444

(22) Filed: Sep. 29, 2004

(65) Prior Publication Data
US 2006/0069670 A1 Mar. 30, 2006

(51) Int. Cl.
*G06F 17/30* (2006.01)
(52) U.S. Cl. ........................................................ 707/726
(58) Field of Classification Search ........................ None
See application file for complete search history.

(56) References Cited

U.S. PATENT DOCUMENTS

| | | | | |
|---|---|---|---|---|
| 5,283,864 | A * | 2/1994 | Knowlton | 715/776 |
| 5,737,599 | A * | 4/1998 | Rowe et al. | 707/10 |
| 6,369,811 | B1 * | 4/2002 | Graham et al. | 715/764 |
| 6,615,209 | B1 * | 9/2003 | Gomes et al. | 707/5 |
| 6,643,641 | B1 * | 11/2003 | Snyder | 707/4 |
| 2002/0103876 | A1 * | 8/2002 | Chatani et al. | 709/217 |
| 2002/0163545 | A1 * | 11/2002 | Hii | 345/838 |
| 2003/0195877 | A1 * | 10/2003 | Ford et al. | 707/3 |
| 2004/0205495 | A1 * | 10/2004 | Genty et al. | 715/501.1 |
| 2005/0065806 | A1 * | 3/2005 | Harik | 705/1 |
| 2005/0198559 | A1 * | 9/2005 | Fujiwara | 715/500 |
| 2006/0020516 | A1 * | 1/2006 | Choi et al. | 705/26 |
| 2006/0059440 | A1 * | 3/2006 | Pry | 715/838 |
| 2006/0075327 | A1 * | 4/2006 | Sriver | 715/501.1 |

OTHER PUBLICATIONS

Author: Adobe system Title: Adobe reader 6.0 . Date: May 26, 2003 Publisher: Adobe system Edition: 6.0 Pertinent pp. 113.*
Author: Amazon.com Title: Search Inside the Book Date: Aug. 23, 2003 Publisher: Amazon.com Pertinent pp. 30 http://web.archive.org/web/20040718153021/http://www.amazon.com/exec/obidos/tg/broswe/-/10197021>.*
Author: Amazon.com Title: Search Inside the Bookk Date: Oct. 30, 2003 Publisher: Amazon.com Pertinent pp. 3 http://web.archive.org/web/20031030122155/http://www.amazon.com/exec/obidos/tg/broswe/-/10197021>.*
Barnes & Noble.com—Book Search; bn.com ; Aug. 12, 2004 (print date); pp. 1-5.
Google Search; catalogs.google.com; Aug. 12, 2004 (print date); pp. 1-7.
Amazon.com—Book Search; amazon.com; Aug. 12, 2004 (print date); pp. 1-16.

(Continued)

*Primary Examiner* — Syling Yen
(74) *Attorney, Agent, or Firm* — Harrity & Harrity, LLP

(57) ABSTRACT

A method includes receiving a search query, identifying a document based on the search query, and providing a search result based on the document. The search result includes, for example, an image associated with the document, an excerpt from the document that is associated with the search query, and links to other excerpts in the document that are associated with the search query. The method may also include providing other information associated with the document.

28 Claims, 20 Drawing Sheets

OTHER PUBLICATIONS

Google News; news.google.com; Aug. 12, 2004 (print date) pp. 1-4.
Adobe Systems: "Adobe Acrobat Reader 6.0 Online Guide"; Internet Publication; 2003; biochem.unizh.ch/biocinfo/Programme/AcroRead/acrruserguide.pdf; print date (Dec. 12, 2005); 113 pages.
Amazon; "Books Search Inside the Book"; Internet Publication; Jul. 18, 2004; amazon.com; print date (Dec. 12, 2005); 3 pages.
Amazon: "Good to Great: Why Some Companies Make the Leap . . . and Others Don't"; Internet Publication; Jul. 12, 2004; amazon.com; print date (Dec. 12, 2005); 8 pages.
International Search Report for corresponding PCT application with a mailing date of Jan. 2, 2006; 4 pages.

* cited by examiner

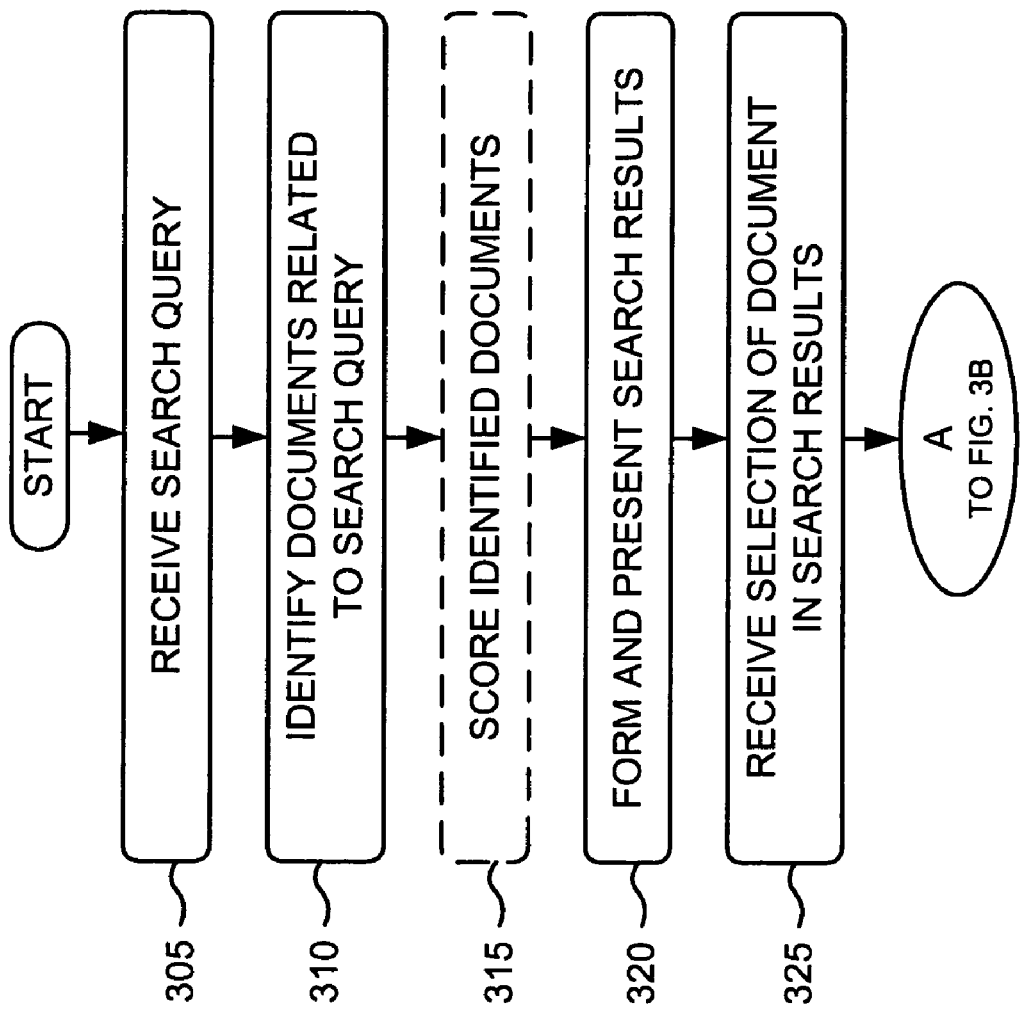

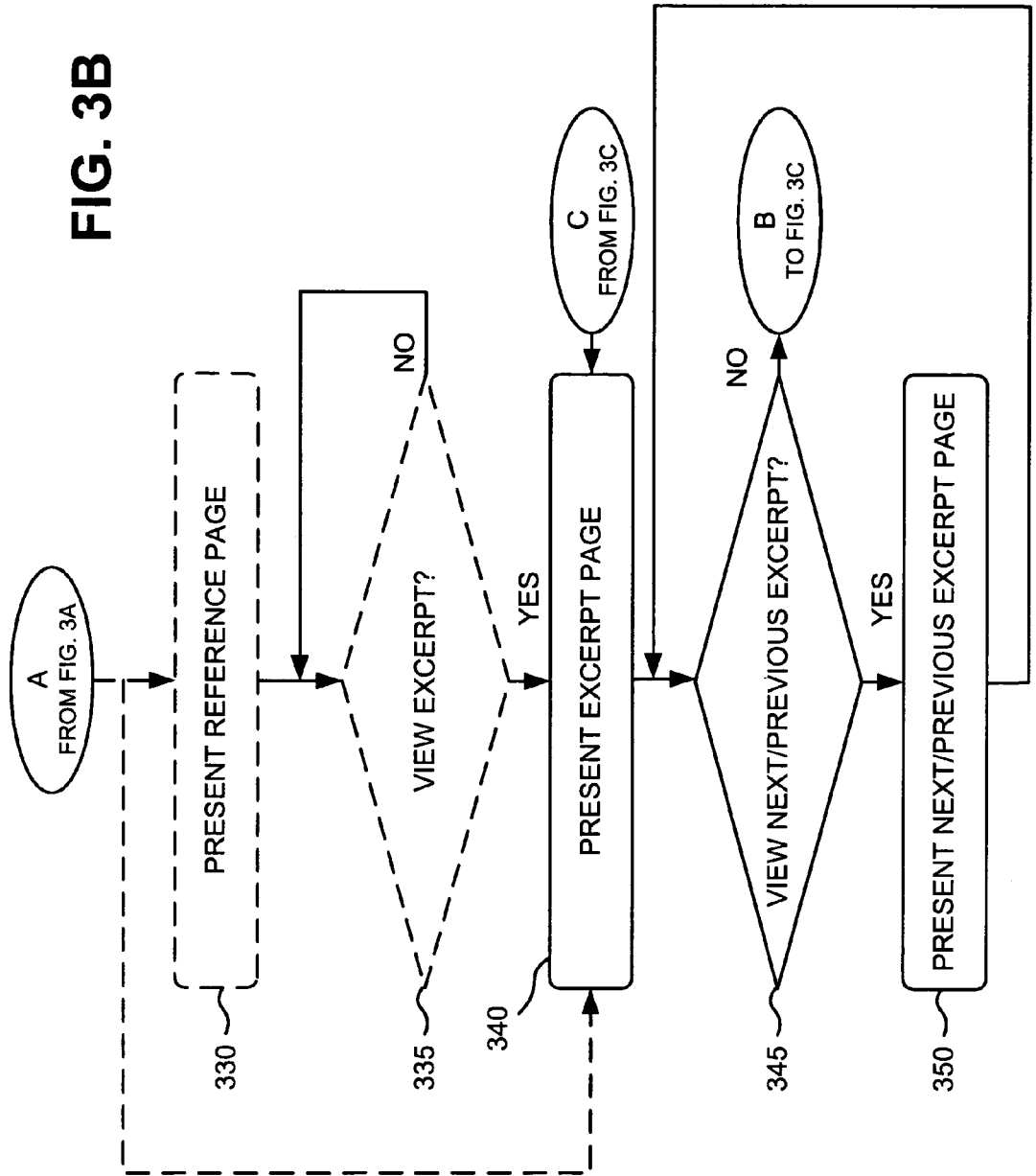

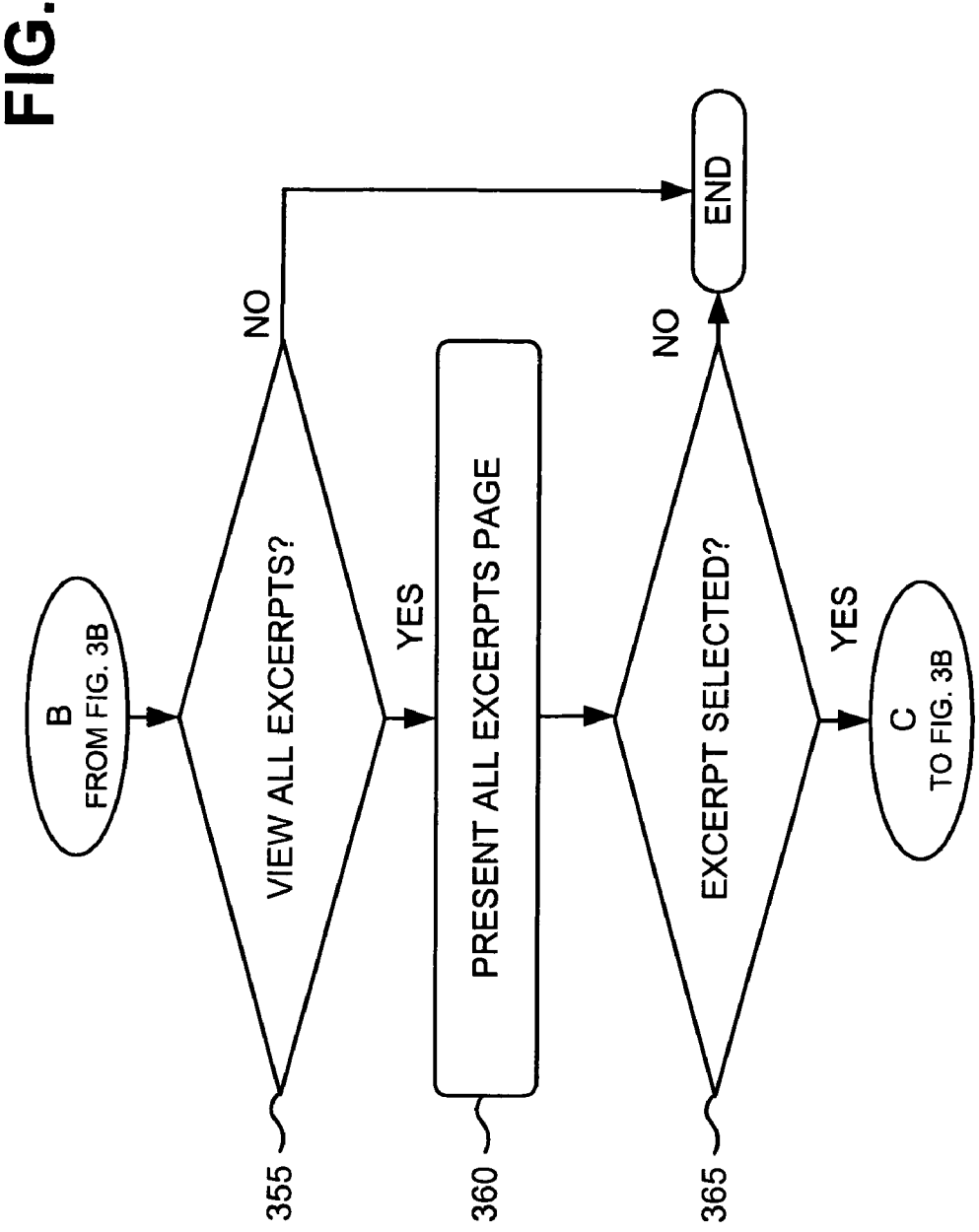

FIG. 4A

PRINT | MEMORY | [SEARCH]

HARNESSING THE RAGE — 412
BY DR. BRUCE BANNER — 414

PAGE 114: " ..... If your brain judges the information important, it places it in your memory "files." The part of your brain responsible for processing memory is the ... Due to this anatomical organization, declarative memory is said to be controlled by higher brain ... while procedural memory ..." — 416

HTTP://ADDRESS123.COM/12345.HTM — 418

109 RESULTS FOR MEMORY, VIEW PAGE: 5-10, 12, 21-23, 26-30, ... — 420

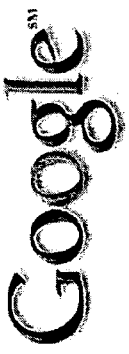

WE ARE ALL SUPERMEN
BY CLARK KENT

PAGE 3: " ... Everyone can do superhuman things. For example, we have all heard stories in which a mother of two lifts a heavy object, like a car, off of her child, but has no memory of doing it. We call such stories fables ... caused by a rush of adrenaline that produces superhuman strength ..."

HTTP://ADDRESS456.COM/ABCDEF.HTM

10 RESULTS FOR MEMORY, VIEW PAGE: 8, 12, 33-35, 41, 49-51

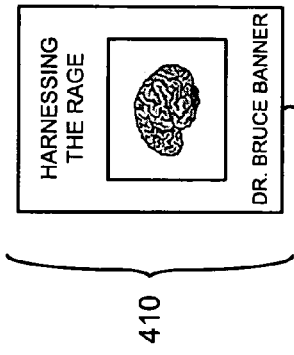

AD(S) ASSOCIATED WITH DOCUMENT(S)

Google

PRINT

MEMORY | [SEARCH]

[HARNESSING THE RAGE box with brain image, DR. BRUCE BANNER] — 460

HARNESSING THE RAGE BY DR. BRUCE BANNER — 452

PAGE 114: "... If your brain judges the information important, it places it in your memory "files." The part of your brain responsible for processing memory is the ... Due to this anatomical organization, declarative memory is said to be controlled by higher brain mechanisms, while procedural memory ..." — 454

PAGE 208: " ... If your brain judges the information important, it places it in your memory "files." The part of your brain responsible for processing memory is the ... Due to this anatomical organization, declarative memory is said to be controlled by higher brain mechanisms, while procedural memory ..." — 456

[VIEW ALL RESULTS FOR MEMORY IN THIS DOCUMENT] — 458

[WE ARE ALL SUPERMEN box]

WE ARE ALL SUPERMEN BY CLARK KENT

PAGE 3: "... Everyone can do superhuman things. For example, we have all heard stories in which a mother of two lifts a heavy object,

— 450

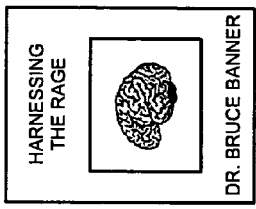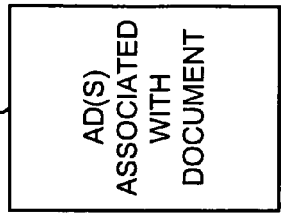
FIG. 5A

FIG. 12

PREVIOUSLY ACCESSED PAGES

PAGE 208
"... If your brain judges the information important, it places it in your memory "files." The part of your brain responsible for processing memory is the ... Due to this anatomical organization, declarative memory is said to be controlled by higher brain mechanisms, while procedural memory ..." — 1220

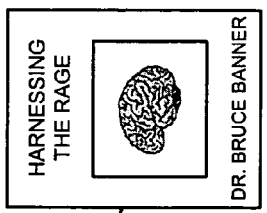

HARNESSING THE RAGE
DR. BRUCE BANNER

PAGE 114
"... All animals have some form of memory. ... How are memories organized in our brain? Is there a particular center in brain for memory? ... why certain techniques work. Brain mind memory encoding, storage, retention, and retrieval. Understand your brains natural memory ..." — 1220

<u>ADDITIONAL PAGES IN THIS DOCUMENT</u> — 1230

PAGE 3
"... Everyone can do superhuman things. For example, we have all heard stories in which a mother of two lifts a heavy object, like a car, off of her child. We call such stories fables or old wives tales. ... caused by a rush of adrenaline that produces superhuman strength ..."

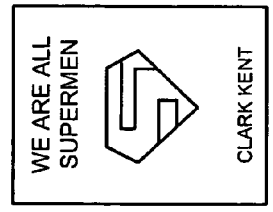

WE ARE ALL SUPERMEN
CLARK KENT

<u>ADDITIONAL PAGES IN THIS DOCUMENT</u>

AD(S) ASSOCIATED WITH DOCUMENT(S) — 1240

USER INTERFACES FOR A DOCUMENT SEARCH ENGINE

BACKGROUND

1. Field of the Invention

Systems and methods consistent with the principles of the invention relate generally to information retrieval and, more particularly, to user interfaces for the presentation of information regarding documents possibly related to a search query.

2. Description of Related Art

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, includes the more traditional printed works of authorship, such as books and magazines. One impediment to making such works digitally available is that it can be difficult to convert printed versions of the works to digital form. Optical character recognition (OCR), which is the act of using an optical scanning device to generate images of text that are then converted to characters in a computer-readable format (e.g., an ASCII file), is a known technique for converting printed text to a useful digital form. OCR systems generally include an optical scanner for generating images of printed pages and software for analyzing the images.

SUMMARY

According to one aspect, a method may include receiving a search query, identifying a document based on the search query, and providing a search result based on the document. The search result may include an image associated with the document, an excerpt from the document that is associated with the search query, and links to other excerpts in the document that are associated with the search query.

According to another aspect, a graphical user interface that is embodied in a computer-readable medium is provided. The graphical user interface may include a set of search results associated with a corresponding set of documents. The search results are generated based on a search query. One of the search results may include an image associated with the document, an excerpt from the document that includes a search term of the search query, and links to other excerpts in the document that include a search term of the search query.

According to a further aspect, a graphical user interface that is embodied in a computer-readable medium is provided. The graphical user interface may include a set of links to portions of a document, an excerpt from the document, where the excerpt may include an image of text from the document, a description of content of the document, information regarding web documents associated with the document, and bibliographic information associated with the document.

According to another aspect, a graphical user interface that is embodied in a computer-readable medium is provided. The graphical user interface may include a page of a document, where the page may includes a search term, a set of links to portions of the document, and a link to a next or previous page of the document that includes the search term.

According to yet another aspect, a graphical user interface that is embodied in a computer-readable medium is provided. The graphical user interface may include a first excerpt from a document, where the first excerpt may include a portion of text of a page of the document and a thumbnail image of the page; and a second excerpt from the document, where the second excerpt may include a portion of text of another page of the document and a thumbnail image of the other page.

According to a further aspect, a graphical user interface that is embodied in a computer-readable medium is provided. The graphical user interface may include a set of images of a corresponding set of pages of a document that include a search term; a set of links associated with the set of images, where each of the links may permit a larger view of the corresponding image to be presented; and a set of links to other portions of the document.

According to another aspect, a graphical user interface that is embodied in a computer-readable medium is provided. The graphical user interface may include information regarding a page of a document and a set of links to previously accessed pages of the document, where each of the links is generated based on a user accessing the previously accessed page.

According to a further aspect, a graphical user interface that is embodied in a computer-readable medium is provided. The graphical user interface may include information regarding a set of previously accessed pages associated with a set of documents and an image associated with one of the documents. The information may be generated based on a user accessing the previously accessed pages.

According to another aspect, a computer-readable medium contains computer-executable instructions and may include instructions for receiving a search query, instructions for identifying a document based on the search query, and instructions for providing a search result based on the document. The search result may include an excerpt from the document that includes a search term associated with the search query and links to other excerpts in the document that include a search term associated with the search query.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 3A-3C are flowcharts of exemplary processing for presenting information regarding documents related to a search query according to an implementation consistent with the principles of the invention;

FIGS. 4A and 4B are exemplary diagrams of user interfaces for presenting search results according to implementations consistent with the principles of the invention;

FIGS. 5A-5C are exemplary diagrams of reference pages that may be presented according to a few implementations consistent with the principles of the invention;

FIGS. 8-13 are exemplary diagrams of graphical user interfaces that may be presented to assist users in accessing previously accessed pages according to a few implementations consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Overview

More and more types of documents are becoming searchable via search engines. For example, some documents, such as books, magazines, and/or catalogs, may be scanned and their text recognized via OCR. It is beneficial to present information regarding these and other types of documents in a manner that is useful to users seeking such information.

Systems and methods consistent with the principles of the invention may provide information regarding documents that may be identified as relevant to search queries in a manner that is useful to the users who provided the search queries.

Exemplary Network Configuration

Figure 1:
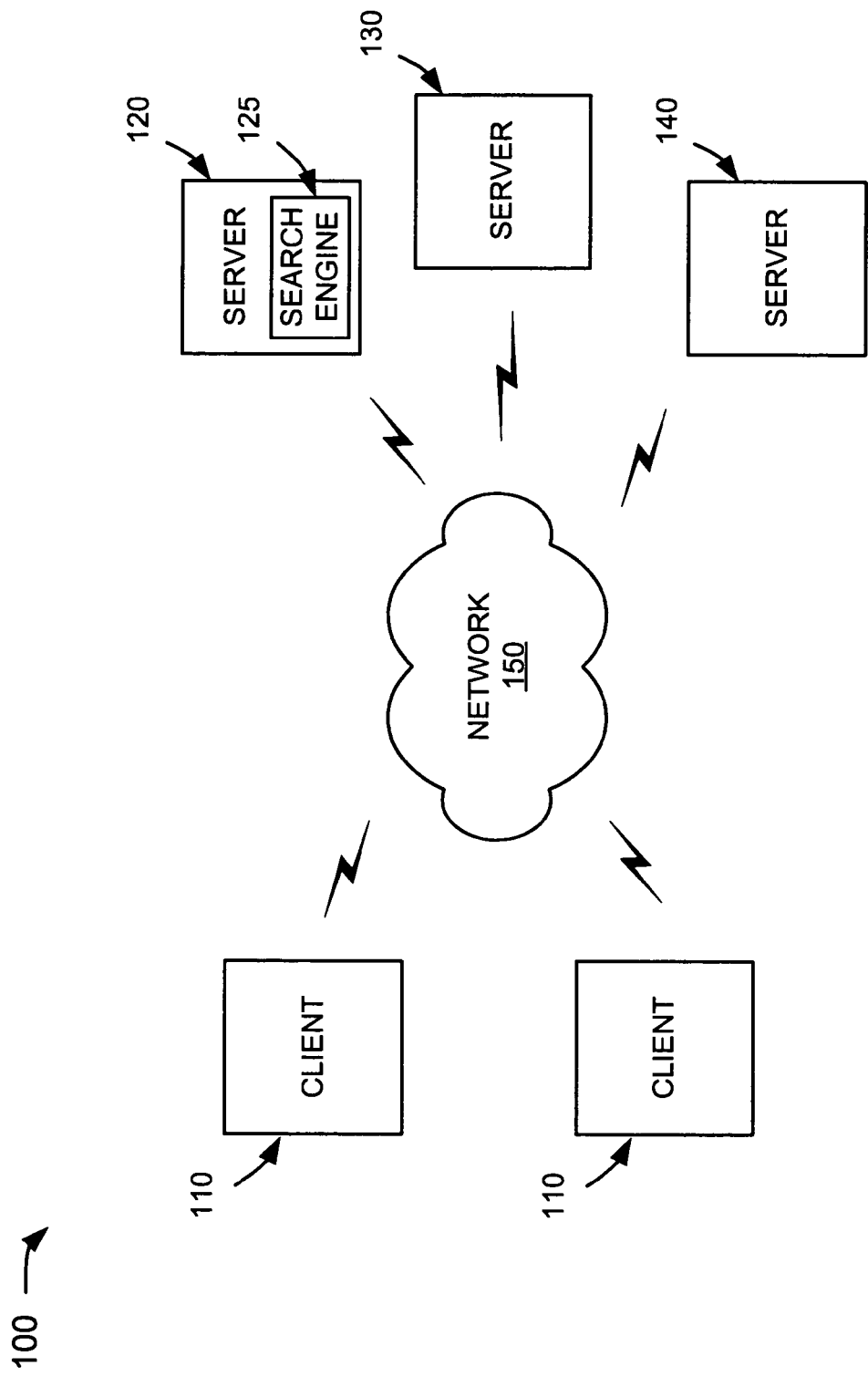
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 120-140 may include server entities that gather, process, search, and/or maintain documents in a manner consistent with the principles of the invention.

In an implementation consistent with the principles of the invention, server 120 may include a search engine 125 usable by clients 110. Server 120 may crawl a corpus of documents (e.g., web documents), index the documents, and store information associated with the documents in a repository of documents. Alternatively or additionally, server 120 may analyze a database (or set of databases) of documents (e.g., books, magazines, newspapers, articles, catalogs, etc.) and store information associated with the documents in the same or a different repository. Servers 130 and 140 may store or maintain documents that may be crawled or analyzed by server 120.

While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Network 150 may include a local area network (LAN), a wide area network (WAN), a telephone network, such as the Public Switched Telephone Network (PSTN), an intranet, the Internet, a memory device, or a combination of networks. Clients 110 and servers 120-140 may connect to network 150 via wired, wireless, and/or optical connections.

Exemplary Client/Server Architecture

Figure 2:
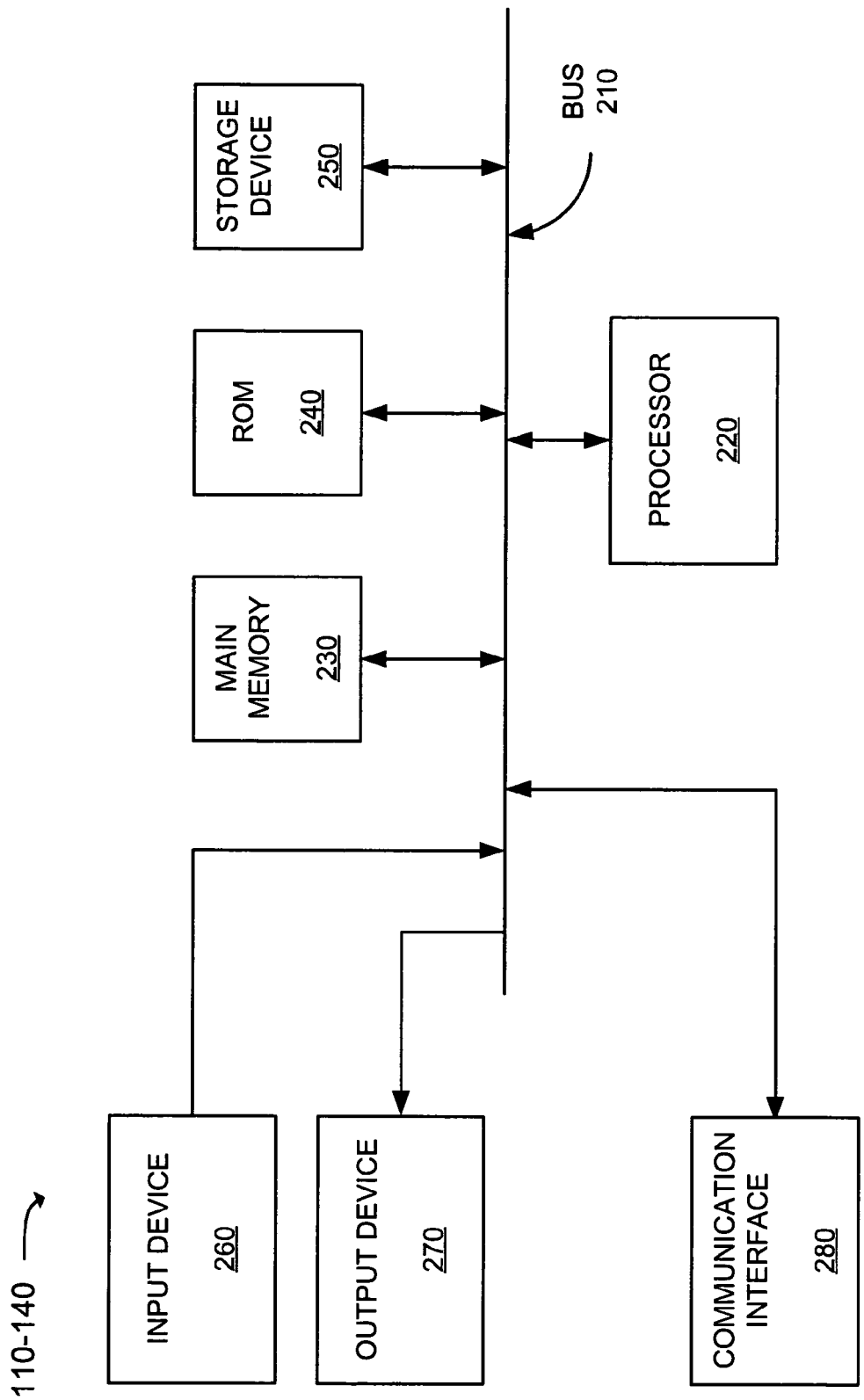
FIG. 2 is an exemplary diagram of a client or server of FIG. 1 according to an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a conventional processor, microprocessor, or processing logic that interprets and executes instructions. Main memory 230 may include a random access memory (RAM) or another type of dynamic storage device that may store information and instructions for execution by processor 220. ROM 240 may include a conventional ROM device or another type of static storage device that may store static information and instructions for use by processor 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, may perform certain searching-related operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

FIGS. 3A-3C are flowcharts of exemplary processing for presenting information regarding documents related to a search query according to an implementation consistent with the principles of the invention. Processing may begin with a user providing a search term (or a group of search terms) as a search query for searching a document repository. In one implementation, the document repository includes documents available from the Internet and/or a database and the vehicle for searching this repository is a search engine, such as search engine 125 (FIG. 1). The user may provide the search query via web browser software on a client, such as client 110 (FIG. 1).

The search query may be received by the search engine and used to identify documents (e.g., books, magazines, newspapers, articles, catalogs, etc.) related to the search query (acts 305 and 310) (FIG. 3A). A number of techniques exist for identifying documents related to a search query. One such technique might include identifying documents that contain the search term or synonyms of the search term. When the search query includes more than one search term, then a technique might include identifying documents that contain the search terms as a phrase, that contain the search terms but not necessarily together, or that contain less than all of the search terms. Yet other techniques are known to those skilled in the art.

Optionally, the documents may be scored in some manner (act 315). For example, the score for a document may be based on an information retrieval (IR) score. Several techniques exist for generating an IR score. For example, an IR score for a document may be generated based on the number of occurrences of the search terms in the document text, where the search terms occur within the document (e.g., title, content, footer, header, etc.), or characteristics of occurrences of the search terms (e.g., font, size, color, etc.). Yet other techniques are known to those skilled in the art.

Search results may be formed based on the documents and their optional scores and presented to the user (act 320). In one implementation, the search results may include information associated with the documents, such as links to the documents, that may optionally be sorted based on the document scores. The search results may be provided as a HTML document, similar to search results provided by conventional search engines. Alternatively, the search results may be provided according to another format agreed upon by the search engine and the client (e.g., Extensible Markup Language (XML)).

FIGS. 4A and 4B are exemplary diagrams of user interfaces for presenting search results according to implementations consistent with the principles of the invention. Assume that a user provided a search query that included the search term "memory" and a search was performed based on the search query to identify a set of documents related to the search query.

In one implementation, as shown in FIG. 4A, a search result 410 may include a document title 412, author information 414, an excerpt 416 from the document, an address 418 associated with the document, optionally links 420 to other relevant excerpts in the document, and an image 422 associated with the document. Document title 412 may include a title associated with the document. Selection of document title 412 may cause detailed information, possibly in the form of a reference page (described below) or an excerpt page (described below), associated with the document to be presented. Author information 414 may include the name(s) of the author(s) of the document.

Excerpt 416 may include a portion of the document that includes a search term of the search query. Optionally, occurrences of the search term may be visually distinguished (e.g., highlighted) in the portion of the document. Excerpt 416 may also include a page number associated with the excerpt. In one implementation, selection of the page number may result in presentation of an excerpt page (described below) associated with the excerpt.

Address 418 may include an address at which the document is stored. Links 420 may permit one or more other excerpts from the document to be presented to the user. Image 422 may include an image of, for example, a front cover (or another portion) of the document (if available). In one implementation, image 422 includes a thumbnail version of the front cover of the document.

In another implementation, as shown in FIG. 4B, a search result 450 may include document title and author information 452, a first excerpt 454 from the document, a second excerpt 456 from the document, optionally a link 458 to other relevant excerpts in the document, and an image 460 associated with the document. Document title and author information 452 may include a title associated with the document and/or the name(s) of the author(s) of the document. Selection of document title and author information 452 may cause detailed information, possibly in the form of a reference page (described below) or an excerpt page (described below), associated with the document to be presented.

First and second excerpts 454 and 456 may include portions of the document that include a search term of the search query. Each of excerpts 454 and 456 may include a page number associated with the excerpt. In one implementation, selection of the page number may result in presentation of an excerpt page (described below) associated with the excerpt. While two excerpts are shown, more or fewer excerpts may be presented.

Link 458 may permit one or more other excerpts from the document to be presented to the user. Image 460 may include an image of, for example, a front cover (or another portion) of the document (if available). In one implementation, image 460 includes a thumbnail version of the front cover of the document.

Returning to FIG. 3A, one of the documents in the search results may be selected by the user (act 325). In one implementation, selection of a document may include selection of a link associated with the document, such as selection of document title 412 (FIG. 4A) or document title and author information 452 (FIG. 4B).

In one implementation consistent with the principles of the invention, detailed information regarding a document, possibly in the form of a reference page, may be presented to the user in response to the user selecting the document (act 330) (FIG. 3B). In another implementation consistent with the principles of the invention, detailed information regarding a document, possibly in the form of an excerpt page, may be presented to the user in response to the user selecting the document (act 340).

Figure 5B:
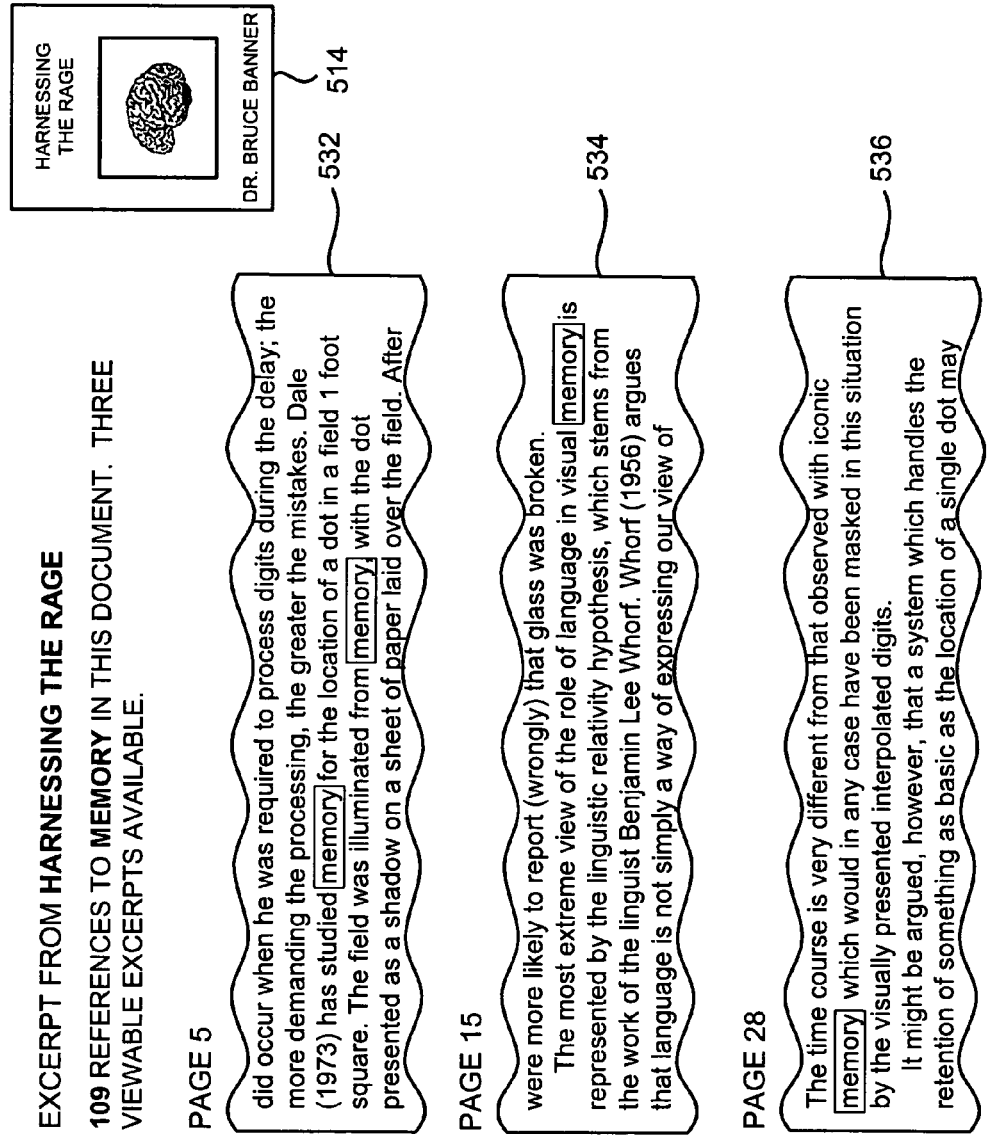
Figure 5C:
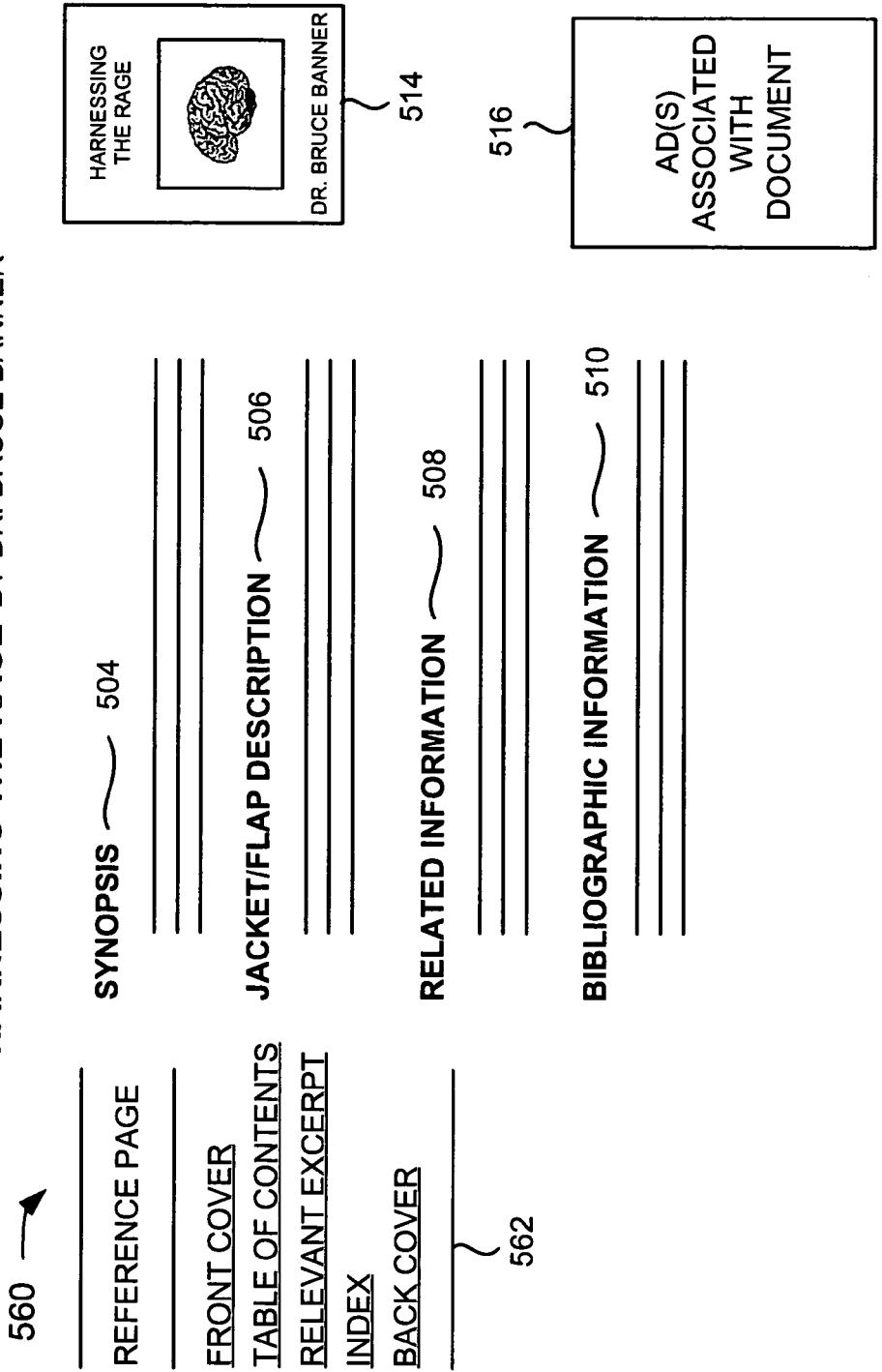

FIGS. 5A-5C are exemplary diagrams of reference pages that may be presented according to a few implementations consistent with the principles of the invention. Similar to the previous example and the examples to follow, assume that a user provided a search query that included the search term "memory" and a search was performed based on the search query to identify a set of documents related to the search query.

In one implementation, as shown in FIG. 5A, a reference page 500 may include an excerpt 502 from the document, a synopsis 504 of the document, a jacket or flap description 506 associated with the document, related information 508, bibliographic information 510, and a set of links 512 to different portions of the document.

Excerpt 502 may include a portion of text from the document that may include a search term of the search query. The portion of text may correspond to an image of the document text or the text version. Occurrences of the search term may be visually distinguished (e.g., highlighted) in the portion of text. In this implementation, the user is permitted to view three excerpts from the document by selecting a selectable object, such as "Next" or "Previous." In other implementations, the user may be permitted to view more or fewer excerpts.

Synopsis 504 may include a brief description of the contents of the document. Jacket or flap description 506 may include text from a jacket, cover, or flap associated with the document. Related information 508 may include information regarding web documents that are related to the document or an author associated with the document. For example, related information 508 may include information relating to web document(s) with a review of the document, web document(s) with a biography of the author, other web document(s) related to the document, web document(s) and/or image(s) related to the author, news article(s) related to the document or the author, and/or product(s) related to the document.

Bibliographic information 510 may include information, such as the ISBN, ISSN, the name of the publisher, the category code that identifies a category of the topical content of the document, the publication date, the title, the name of an author associated with the document, and/or a format (e.g., hardcover, paperback, etc.) associated with the document. In other implementations, bibliographic information 510 may include more, fewer, or different pieces of information. Links 512 may include links to various portions of the document. For example, the links may reference the front cover, the table of contents, the index, and/or the back cover of the document.

Reference page 500 may also include an image 514 and/or an advertisement (ad) 516 associated with the document. Image 514 may include an image of, for example, a front cover (or another portion) of the document (if available). In one implementation, image 514 includes a thumbnail version of the front cover of the document. Advertisement 516 may include a set of advertisements associated with a business that sells the document, other documents associated with the author, and/or documents related to this document. Advertisement 516 may also, or alternatively, include an advertisement associated with or derived from, the search query, other (related) documents, or user behavior.

In an alternate implementation, as shown in FIG. 5B, a reference page 530 may include a synopsis regarding the document (not shown), a jacket or flap description associated with the document (not shown), related information (not shown), bibliographic information (not shown), a set of links 512 to different portions of the document, an image 514 associated with the document, and/or an advertisement (not shown) associated with the document as shown in and described with respect to FIG. 5A. Reference page 530 may also include a set of excerpts 532-536 from the document. Excerpts 532-536 may include portions of text from the document that may include a search term of the search query. The portions of text may correspond to images of the document text or the text versions. Occurrences of the search term may be visually distinguished (e.g., highlighted) in the portions of text. In this implementation, three excerpts from the document may be presented. In other implementations, more or fewer excerpts may be presented.

In yet another implementation, as shown in FIG. 5C, a reference page 560 may include a synopsis 504 regarding the document, a jacket or flap description 506 associated with the document, related information 508, bibliographic information 510, an image 514 associated with the document, and/or an advertisement (ad) 516 associated with the document as shown in and described with respect to FIG. 5A. Reference page 560 may also include a set of links 562 to different portions of the document. Links 562 may include links to various portions of the document. For example, the links may reference the front cover, the table of contents, a relevant excerpt, the index, and/or the back cover of the document. Selection of the excerpt link may cause an excerpt page to be presented, as described below.

Returning to FIG. 3B, it may optionally be determined whether an excerpt of the document is desired (act 335). In one implementation, selection of the excerpt link (FIG. 5C), a document in a set of search results (FIGS. 4A and 4B), or a page number associated with an excerpt (FIGS. 4A and 4B) may indicate a user's desire to be presented with an excerpt of the document. In response, an excerpt page may be presented (act 340).

Figure 6:
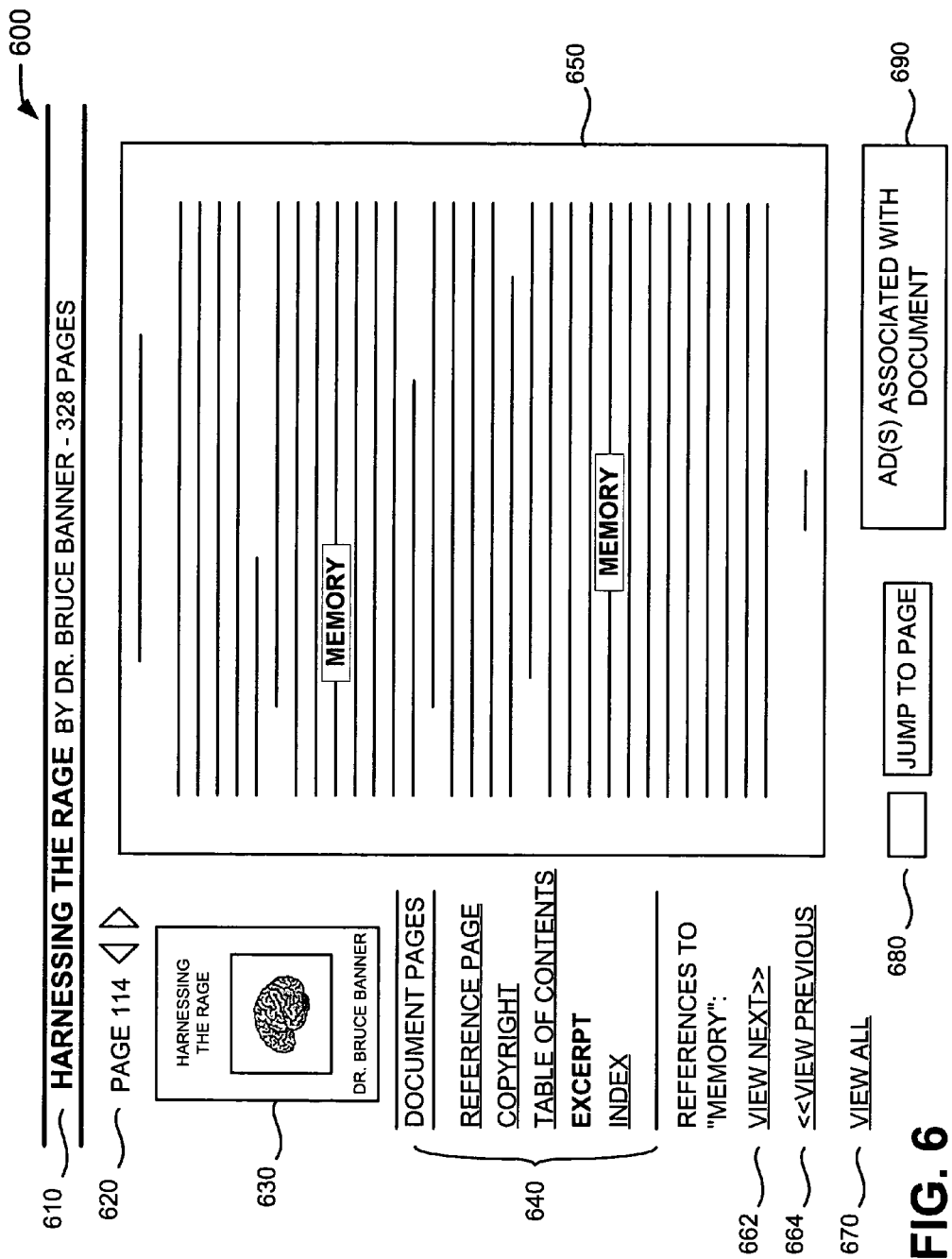
FIG. 6 is an exemplary diagram of an excerpt page that may be presented according to an implementation consistent with the principles of the invention.

FIG. 6 is an exemplary diagram of an excerpt page 600 that may be presented according to an implementation consistent with the principles of the invention. Excerpt page 600 may include document title and author information 610, page number information 620, an image 630 associated with the document, links 640 to different portions of the document, an excerpt 650 from the document, a link 662 for viewing a next excerpt, a link 664 for viewing a previous excerpt, a link 670 for viewing all excerpts, an option 680 to jump to a particular page in the document, and an advertisement 690 associated with the document.

Document title and author information 610 may include a title associated with the document and/or the name(s) of the author(s) of the document. Page number information 620 may include a page number associated with excerpt 650. Page number information 620 may optionally include selectable objects that permit a previous or next page in the document to be presented. Image 630 may include an image of, for example, a front cover (or another portion) of the document (if available). In one implementation, image 630 includes a thumbnail version of the front cover of the document.

Links 640 may include links to various portions of the document. For example, the links may reference a reference page (e.g., FIGS. 5A-5C), the copyright page, the table of contents, an excerpt, and/or the index associated with the document. In other implementations, links 640 may reference more, fewer, or different portions of the document. The document portions may optionally be linked together to permit a user to peruse them. For example, in response to selection of a link, such as the table of contents link, a table of contents page may be presented similar to excerpt 650. A user may be presented with other pages of the table of contents or pages of other document portions in response to the user selecting a forward or backward arrow, such as the selectable objects associated with page information 620. In one implementation, the user may be presented with pages of each of the document portions in response to repeated selections of the forward or backward arrow. In another implementation, the user may be presented with pages within a single document portion in response to repeated selections of the forward or backward arrow. In this latter implementation, the user may select a link corresponding to another document portion to view a page, or set of pages, corresponding to that document portion.

Excerpt 650 may include text from a page of the document that may include a search term of the search query. Excerpt 650 may correspond to an image of the page text or the text version and, in one implementation, may include all or substantially all of the text from the page. Occurrences of the search term may be visually distinguished (e.g., highlighted) on the page. In another implementation, excerpt 650 may include text from a set of two (or more) pages. The pages may optionally be presented in a manner based on their corresponding page numbers.

View next link 662 may permit a next excerpt from the document to be presented. The next excerpt may correspond to another page from the document that may include a search term of the search query, which may or may not be the next sequential page in the document. View previous link 664 may permit a previous excerpt from the document to be presented. The previous excerpt may correspond to another page from the document that may include a search term of the search query, which may or may not be the previous sequential page in the document.

View all link 670 may permit all, substantially all, or a predetermined number of excerpts from the document to be presented. The excerpts may be presented in a manner described in more detail below. Option 680 may include a page number box and a jump to page button. A page number may be provided in the page number box and when the jump to page button is selected, the corresponding page may be presented in a manner similar to excerpt 650. Advertisement 690 may include a set of advertisements associated with a business that sells the document, other documents associated with the author, and/or documents related to this document. Advertisement 690 may also, or alternatively, include an advertisement associated with or derived from the search query, other (related) documents, or user behavior.

Returning to FIG. 3B, it may be determined whether a next or previous excerpt page is desired (act 345). In one implementation, selection of view next link 662 (FIG. 6) may indicate a user's desire to be presented with a next excerpt from the document and selection of view previous link 664 may indicate a user's desire to be presented with a previous excerpt from the document. In response to selection of view next link 662 or view previous link 664, a next or previous excerpt page, similar to excerpt page 600 (FIG. 6), may be presented (act 350).

It may also be determined whether all excerpts are desired (act 355) (FIG. 3C). In one implementation, selection of view all link 670 (FIG. 6) may indicate a user's desire to be presented with all excerpts from the document. In response to selection of view all link 670, an all excerpts page may be presented (act 360).

Figure 7A:
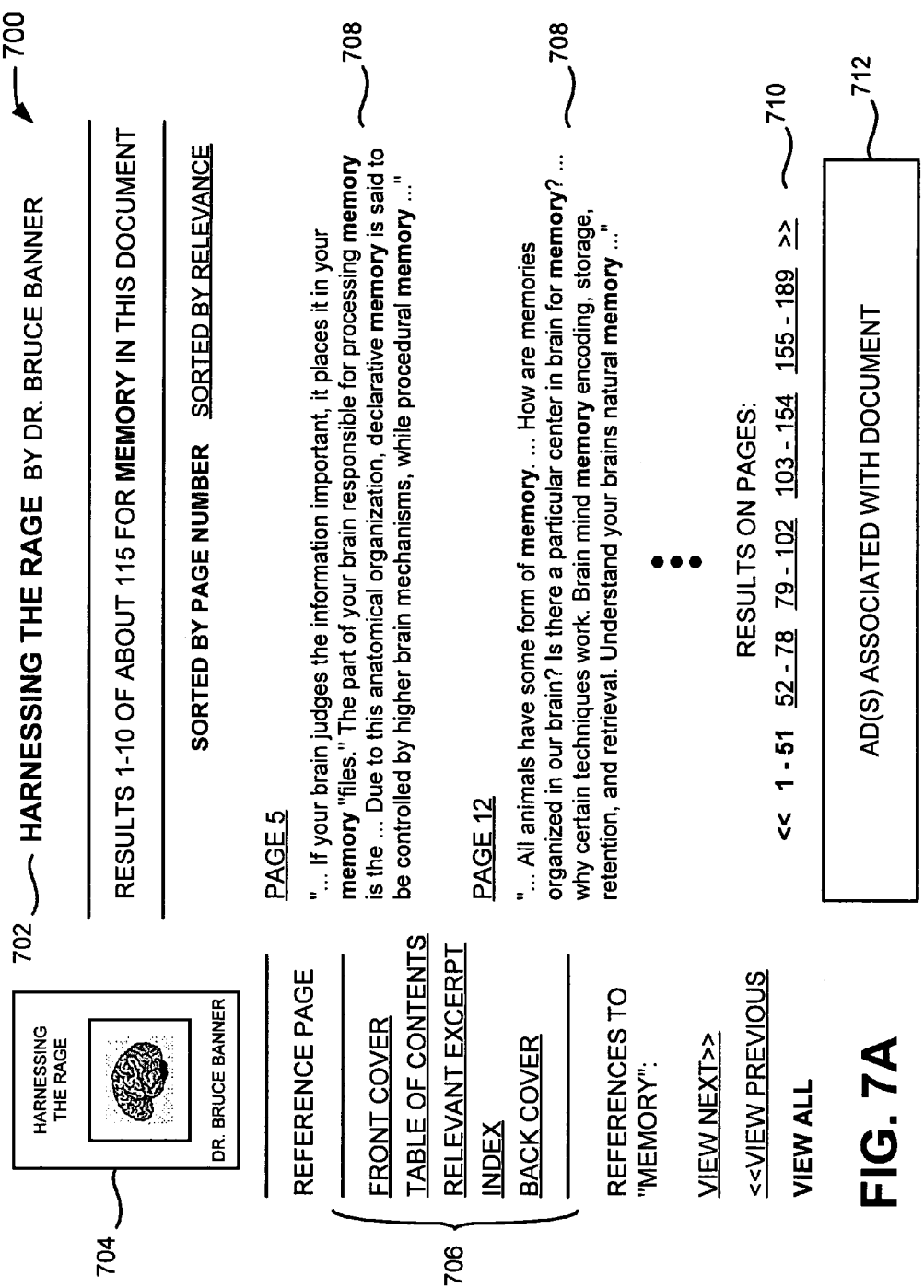
FIGS. 7A-7C are exemplary diagrams of all excerpts pages that may be presented according to a few implementations consistent with the principles of the invention.
Figure 7B:
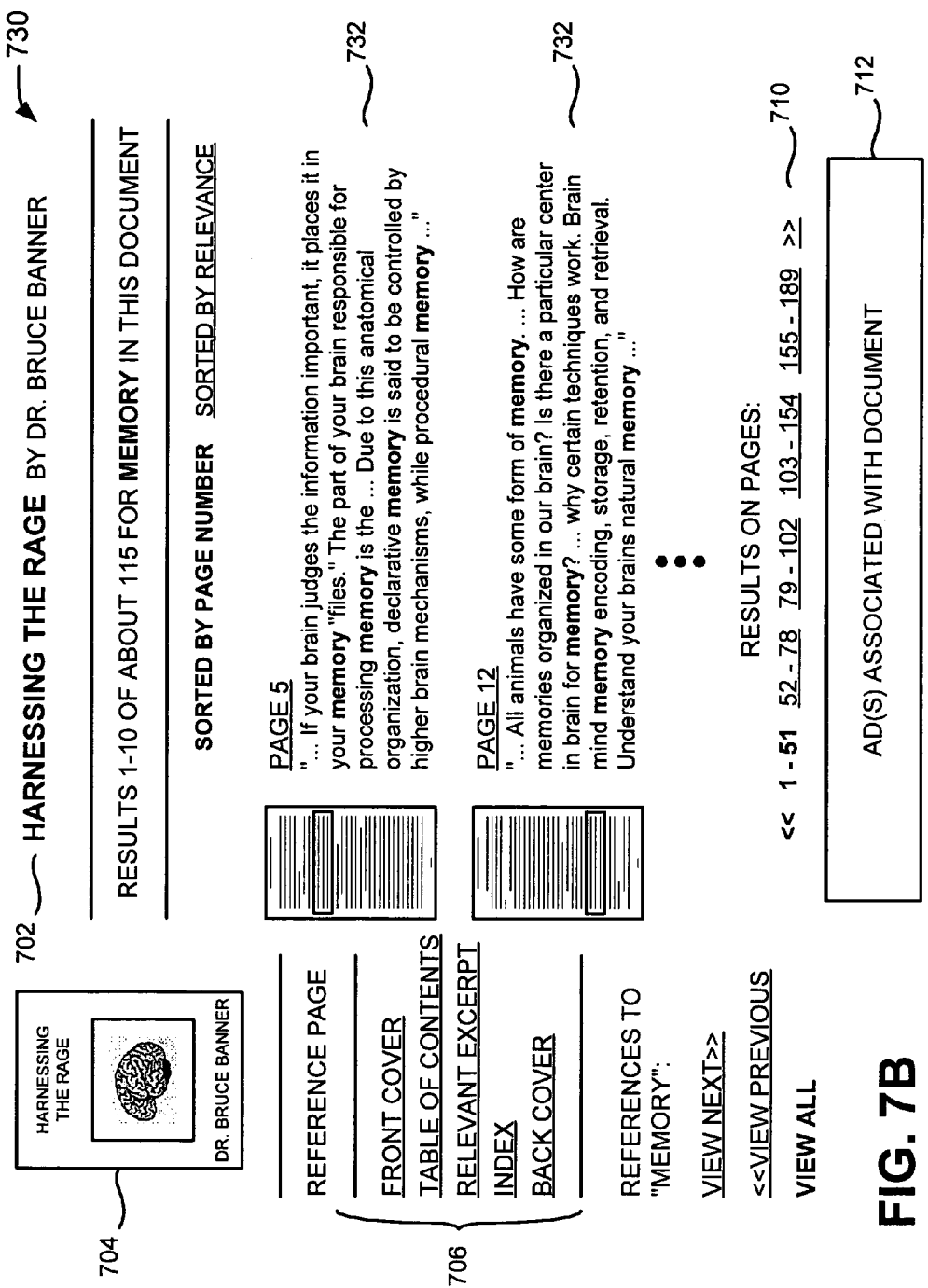
Figure 7C:
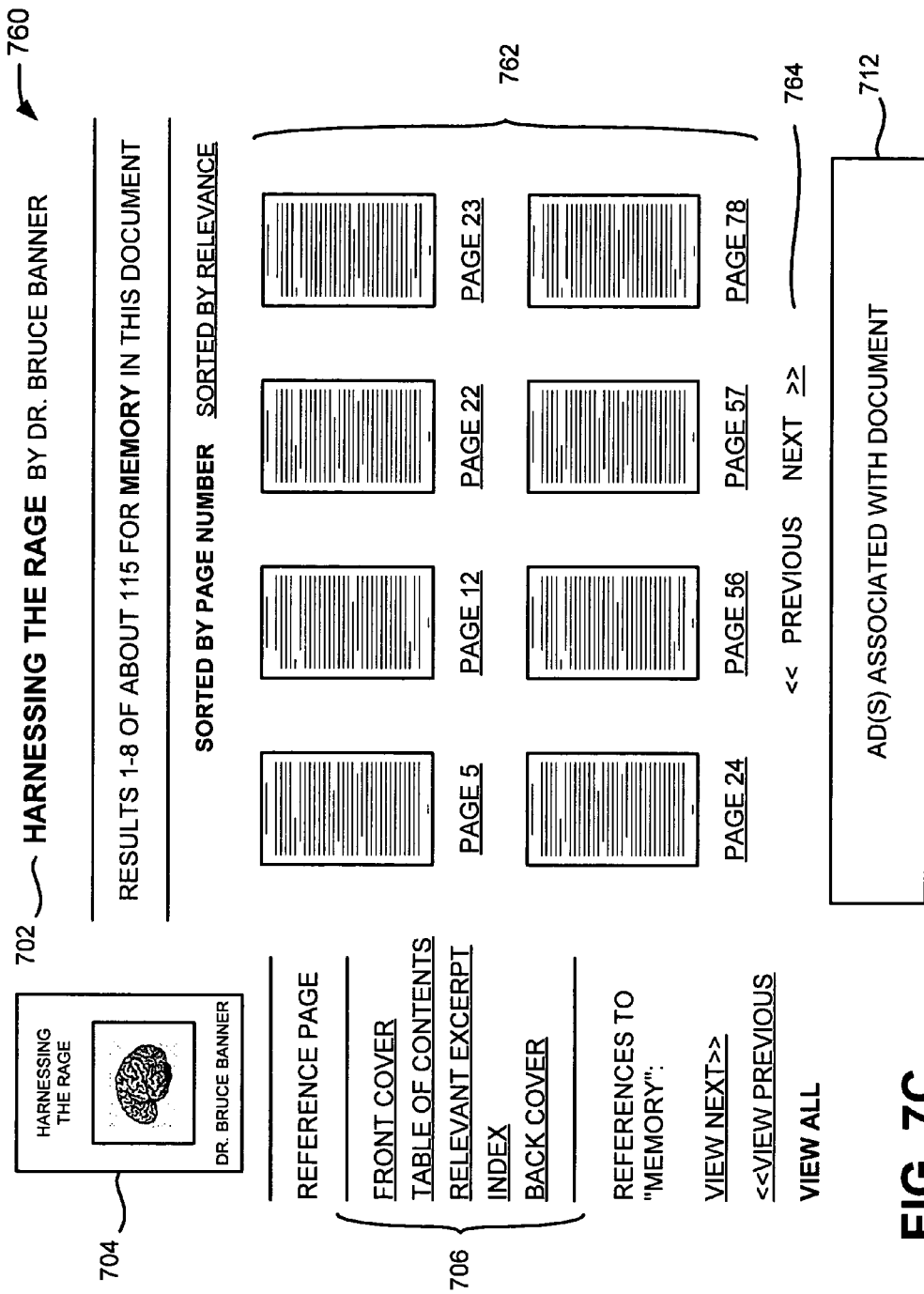

FIGS. 7A-7C are exemplary diagrams of all excerpts pages that may be presented according to a few implementations consistent with the principles of the invention. In one implementation, as shown in FIG. 7A, an all excerpts page 700 may include document title and author information 702, an image 704 associated with the document, links 706 to different portions of the document, a set of excerpts 708 from the document, a set of links 710 to other excerpts in the document, and an advertisement 712 associated with the document.

Document title and author information 702 may include a title associated with the document and/or the name(s) of the author(s) of the document. Image 704 may include an image of, for example, a front cover (or another portion) of the document (if available). In one implementation, image 704 includes a thumbnail version of the front cover of the document. Links 706 may include links to various portions of the document. For example, the links may reference the front cover, the table of contents, an excerpt, the index, and/or the back cover associated with the document. In other implementations, links 706 may reference more, fewer, or different portions of the document.

Excerpts 708 may include portions of text from the document that may include a search term of the search query. The portions of text may correspond to images of the document text or the text versions. Occurrences of the search term may be visually distinguished (e.g., highlighted) within the portions of text. Each of excerpts 708 may include a page number associated with the excerpt. In one implementation, selection of the page number may result in presentation of an excerpt page, such as excerpt page 600 (FIG. 6), associated with the excerpt.

Links 710 may correspond to other excerpts from the document. A link associated with a set of document pages may be selected and relevant excerpts within these pages may be presented. Presentation of these additional excerpts may resemble all excerpts page 700. Advertisement 712 may include a set of advertisements associated with a business that sells the document, other documents associated with the author, and/or documents related to this document. Advertisement 712 may also, or alternatively, include an advertisement associated with or derived from the search query, other (related) documents, or user behavior.

In an alternate implementation, as shown in FIG. 7B, an all excerpts page 730 may include document title and author information 702, an image 704 associated with the document, links 706 to different portions of the document, a set of links 710 to other excerpts in the document, and an advertisement 712 associated with the document, as shown in and described with respect to FIG. 7A. All excerpts page 730 may also include a set of excerpts 732 from the document.

Excerpts 732 may include portions of text from the document that may include a search term of the search query. The portions of text may correspond to images of the document text or the text versions. Occurrences of the search term may be visually distinguished (e.g., highlighted) within the portions of text. Each of excerpts 732 may include a page number associated with the excerpt. In one implementation, selection of the page number may result in presentation of an excerpt page, such as excerpt page 600 (FIG. 6), associated with the excerpt. Each of excerpts 732 may also include an image associated with the excerpt. In one implementation, the image includes an image of the page containing the excerpt and possibly an indicator that identifies where on the page the excerpt occurs. The image may include an embedded link that, when selected, may result in presentation of an excerpt page, such as excerpt page 600, associated with the excerpt.

In yet another implementation, as shown in FIG. 7C, an all excerpts page 760 may include document title and author information 702, an image 704 associated with the document, links 706 to different portions of the document, and an advertisement 712 associated with the document, as shown in and described with respect to FIG. 7A. All excerpts page 760 may also include a set of page images 762 associated with the document and links 764 to other sets of page images. Page images 762 may include images of pages of the document that may include a search term of the search query and page numbers associated with these pages. In one implementation, selection of a page number may result in presentation of an excerpt page, such as excerpt page 600 (FIG. 6), associated with the page. The page images may include embedded links that, when selected, may result in presentation of excerpt pages, such as excerpt page 600, associated with the pages. Links 764 may permit presentation of a previous set or a next set of page images.

Returning to FIG. 3C, it may be determined whether an excerpt (or a page image) is selected (act 365). Excerpts and/or page images may be selected in a manner similar to that described above. Also as described above, selection of an excerpt and/or a page image may result in presentation of an excerpt page associated with the selected excerpt and/or page image (act 340) (FIG. 3B).

Previously Accessed Pages

It may be beneficial to provide users with easy access to pages of a document that the users previously accessed. It may also be beneficial to provide users with easy access to pages from different documents that the users previously accessed. Either of these would assist users in finding information of interest. Techniques exist for tracking pages accessed by users.

Figure 8:
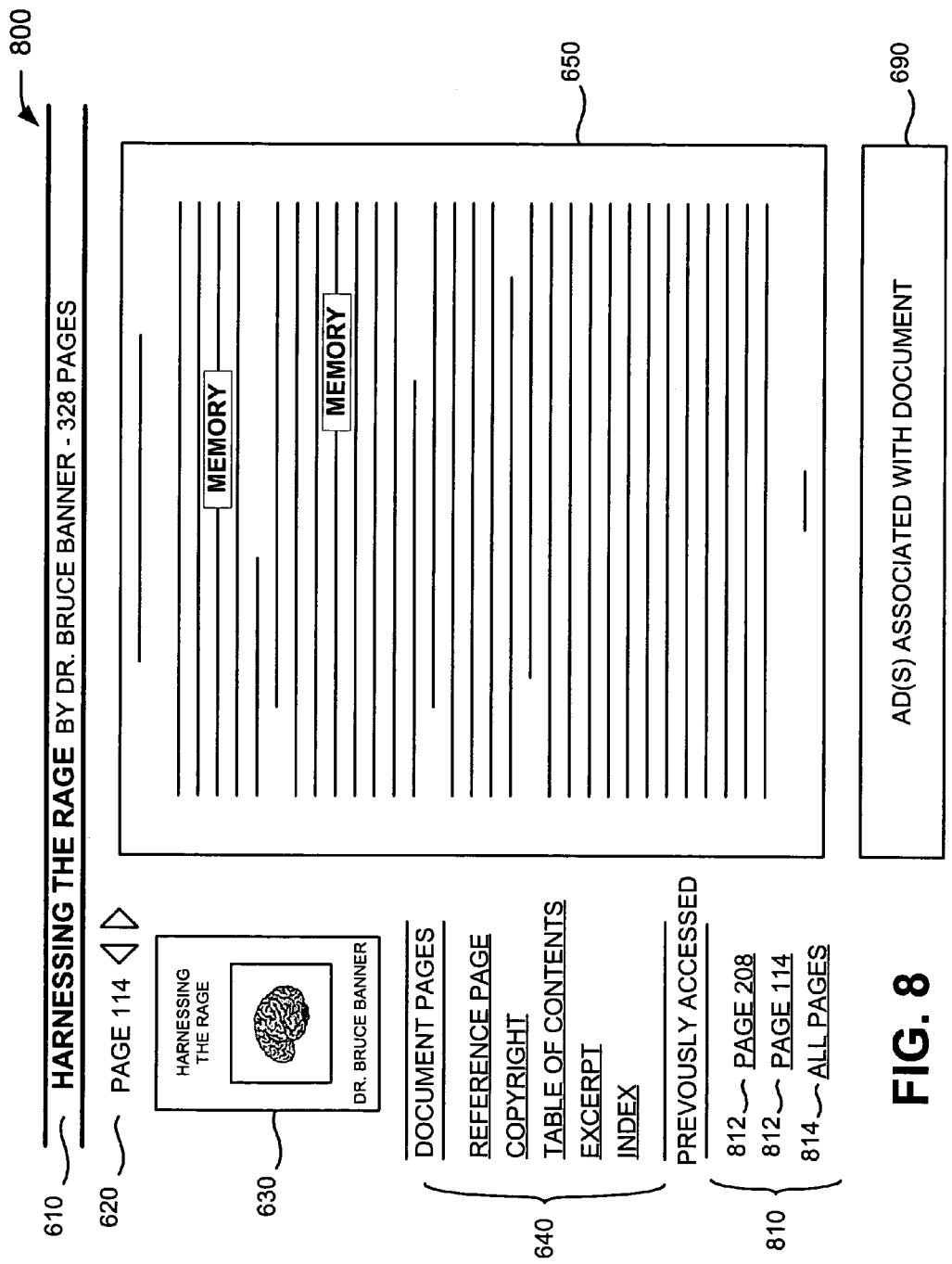

FIGS. 8-13 are exemplary diagrams of graphical user interfaces that may be presented to assist users in accessing previously accessed pages according to a few implementations consistent with the principles of the invention. An exemplary diagram of an excerpt page 800 that may be presented according to an implementation consistent with the principles of the invention is shown in FIG. 8. Excerpt page 800 may include document title and author information 610, page number information 620, an image 630 associated with the document, links 640 to different portions of the document, an excerpt 650 from the document, and an advertisement 690 associated with the document, as shown in and described with respect to FIG. 6.

Excerpt page 800 may also include a set of links 810 associated with previously accessed pages. Links 810 may include links 812 to particular previously accessed pages and a link 814 to all previously accessed pages. Selection of one of links 812 may cause an excerpt page similar to excerpt page 800 to be presented. Selection of link 814 may cause a page of previously accessed pages to be presented.

Figure 9:
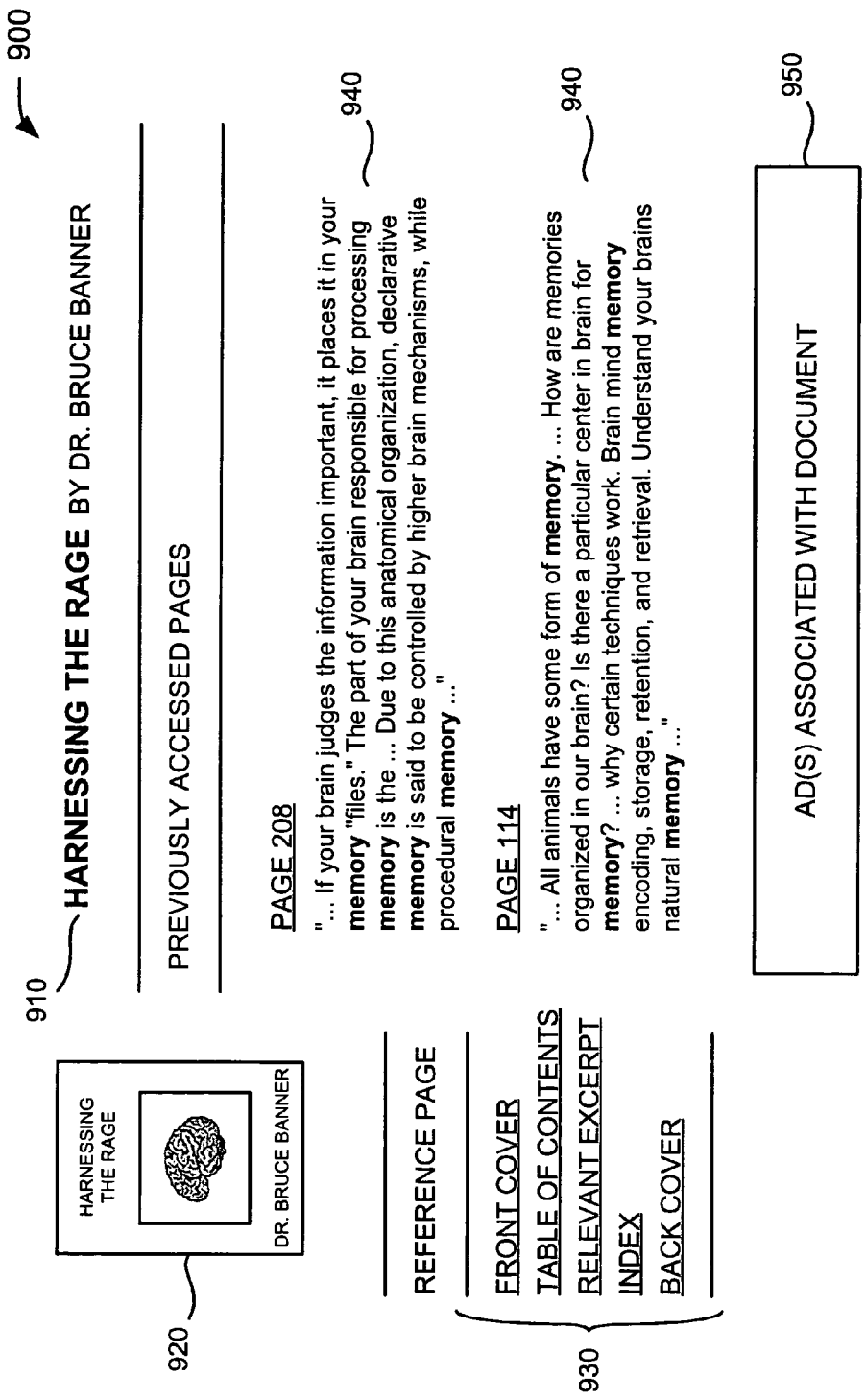

In one implementation, as shown in FIG. 9, a page 900 of previously accessed pages associated with a document may include document title and author information 910, an image 920 associated with the document, links 930 to different portions of the document, a set of excerpts 940 associated with previously accessed pages from the document, and an advertisement 950 associated with the document.

Document title and author information 910 may include a title associated with the document and/or the name(s) of the author(s) of the document. Image 920 may include an image of, for example, a front cover (or another portion) of the document (if available). In one implementation, image 920 includes a thumbnail version of the front cover of the document. Links 930 may include links to various portions of the document. For example, the links may reference the front cover, the table of contents, an excerpt, the index, and/or the back cover associated with the document. In other implementations, links 930 may reference more, fewer, or different portions of the document. Advertisement 950 may include a set of advertisements associated with a business that sells the document, other documents associated with the author, or documents related to this document. Advertisement 950 may also, or alternatively, include an advertisement associated with or derived from the search query, other (related) documents, or user behavior.

Excerpts 940 may include portions of text from previously accessed pages of the document. The portions of text may correspond to images of the document text or the text versions. Optionally, occurrences of a search term may be visually distinguished (e.g., highlighted) within the portions of text. Each of excerpts 940 may include a page number associated with the excerpt. In one implementation, selection of the page number may result in presentation of an excerpt page, such as excerpt page 800 (FIG. 8), associated with the excerpt. While two excerpts 940 are shown in FIG. 9, the number of excerpts 940 may be configurable based on time (e.g., all pages accessed within the last 10 hours) or number (e.g., the last 20 pages accessed).

Figure 10:
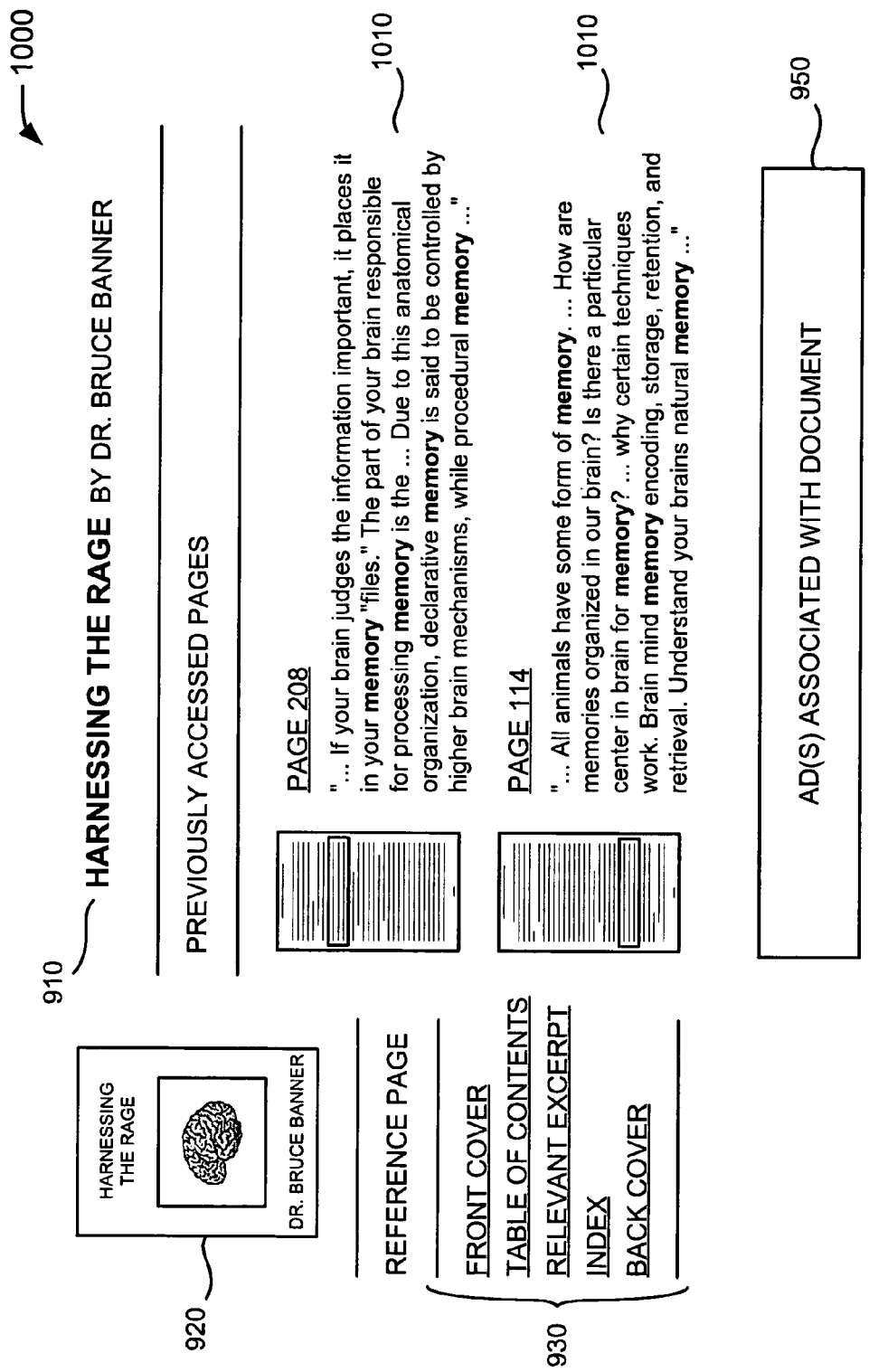

In an alternate implementation, as shown in FIG. 10, a page 1000 of previously accessed pages associated with a document may include document title and author information 910, an image 920 associated with the document, links 930 to different portions of the document, and an advertisement 950 associated with the document, as shown in and described with respect to FIG. 9. Page 1000 may also include a set of excerpts 1010 associated with previously accessed pages from the document.

Excerpts 1010 may include portions of text from previously accessed pages of the document. The portions of text may correspond to images of the document text or the text versions. Optionally, occurrences of a search term may be visually distinguished (e.g., highlighted) within the portions of text. Each of excerpts 1010 may include a page number associated with the excerpt. In one implementation, selection of the page number may result in presentation of an excerpt page, such as excerpt page 800 (FIG. 8), associated with the excerpt.

Each of excerpts 1010 may also include an image associated with the excerpt. In one implementation, the image includes an image of the page containing the excerpt and possibly an indicator that identifies where on the page the excerpt occurs. The image may include an embedded link that, when selected, may result in presentation of an excerpt page, such as excerpt page 800, associated with the excerpt. While two excerpts 1010 are shown in FIG. 10, the number of excerpts 1010 may be configurable based on time (e.g., all pages accessed within the last 2 days) or number (e.g., the last 30 pages accessed).

Figure 11:
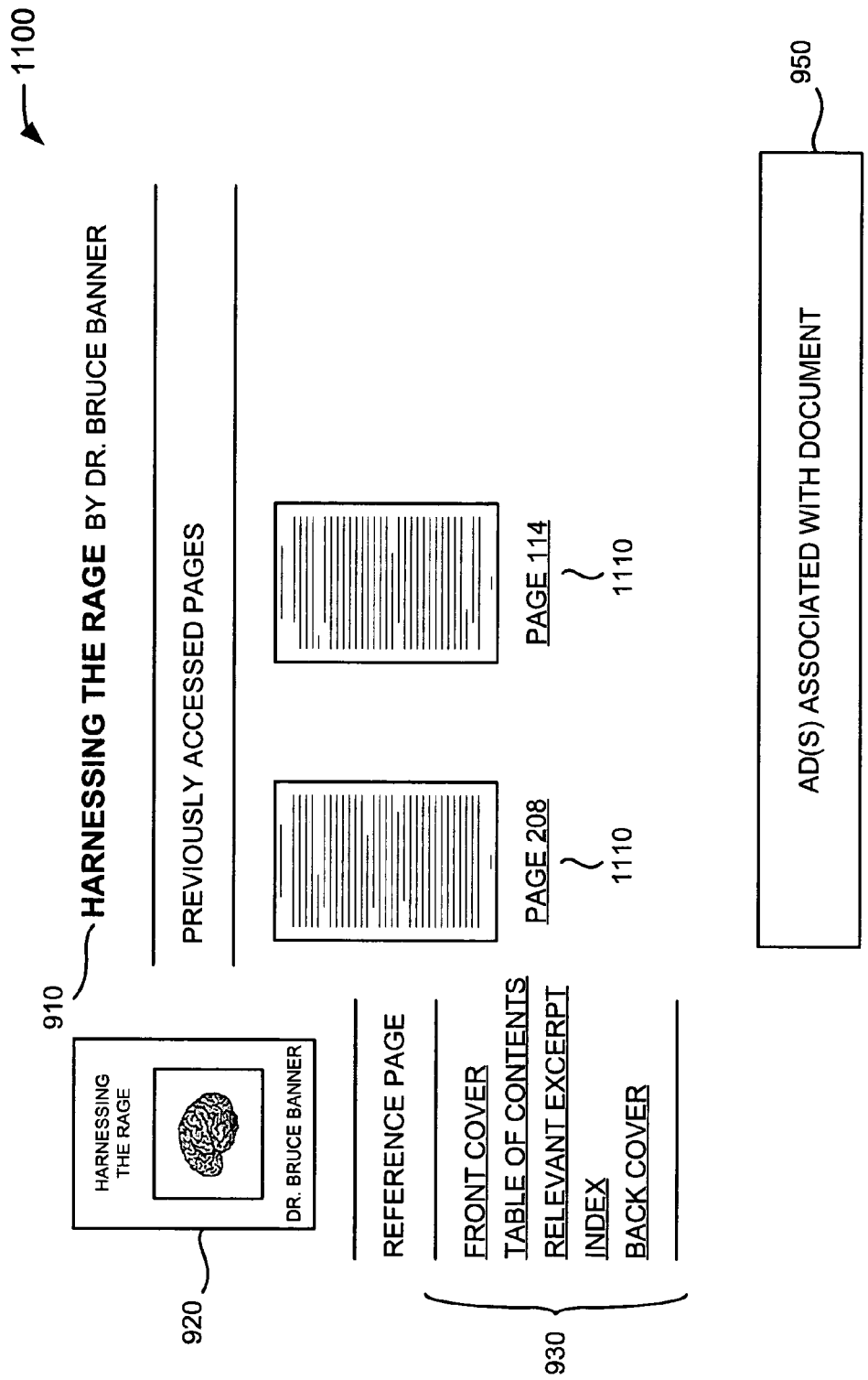

In yet another implementation, as shown in FIG. 11, a page 1100 of previously accessed pages associated with a document may include document title and author information 910, an image 920 associated with the document, links 930 to different portions of the document, and an advertisement 950 associated with the document, as shown in and described with respect to FIG. 9. Page 1100 may also include a set of page images 1110 associated with the document and possibly links to other sets of page images if necessary (not shown). Page images 1110 may include images of pages of the document that were previously accessed and page numbers associated with these pages. In one implementation, selection of a page number may result in presentation of an excerpt page, such as excerpt page 800, associated with the page. The page images may include embedded links that, when selected, may result in presentation of excerpt pages, such as excerpt page 800, associated with the pages.

In a further implementation, as shown in FIG. 12, a page 1200 of previously accessed pages may be associated with a number of documents. As shown in FIG. 12, page 1200 may include, for each document, an image 1210 associated with the document (if available), an excerpt 1220 associated with the document, and a link 1230 to other previously accessed pages in the document (if necessary).

Image 1210 may include an image of, for example, a front cover (or another portion) of the document (if available). In one implementation, image 1210 includes a thumbnail version of the front cover of the document. Excerpt 1220 may include a portion of text from a previously accessed page of the document. The portion of text may correspond to an image of the document text or the text version. Excerpt 1220 may include a page number associated with the excerpt. In one implementation, selection of the page number may result in presentation of an excerpt page, such as excerpt page 800, associated with the excerpt. Link 1230 may permit other previously accessed pages associated with this document (if any) to be presented.

Page 1200 may also include an advertisement 1240. Advertisement 1240 may include a set of advertisements associated with a business that sells a document associated with page 1200, other documents associated with an author of a document associated with page 1200, and/or documents related to a document associated with page 1200. Advertisement 1240 may also, or alternatively, include an advertisement associated with or derived from a search query, other (related) documents, or user behavior.

Figure 13:
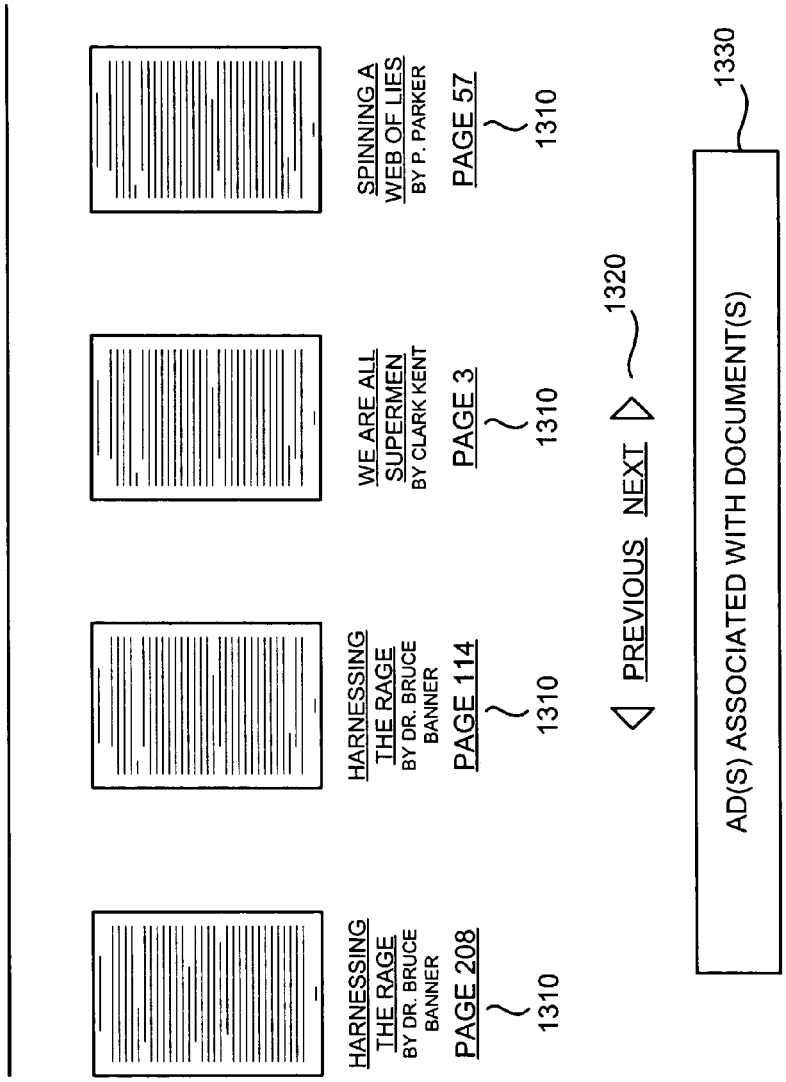

In another implementation, as shown in FIG. 13, a page 1300 of previously accessed pages may be associated with a number of documents. As shown in FIG. 13, page 1300 may include a set of page images 1310 associated with a set of documents and possibly links 1320 to other sets of page images (if any). A page image 1310 may include an image of a page of a document that was previously accessed. A page number associated with the page and document information (e.g., title and/or author information) associated with the document may be provided along with the image of the page. In one implementation, selection of the page number or document information may result in presentation of an excerpt page, such as excerpt page 800, associated with the page. The page images may include embedded links that, when selected, may result in presentation of excerpt pages, such as excerpt page 800, associated with the pages.

Page 1300 may also include an advertisement 1330. Advertisement 1330 may include a set of advertisements associated with a business that sells a document associated with page 1300, other documents associated with an author of a document associated with page 1300, or documents related to a document associated with page 1300. Advertisement 1330 may also, or alternatively, include an advertisement associated with or derived from a search query, other (related) documents, or user behavior.

Conclusion

Systems and methods consistent with the principles of the invention may provide information regarding documents in a manner that is useful to the users.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3A-3C, the order of the acts may be modified in other implementations consistent with the principles of the invention. Further, non-dependent acts may be performed in parallel.

It has been described that a document is identified as a result of a search. In other implementations, however, the document may be identified in other ways, such as from a directory, category, or other listing of documents.

Also, exemplary graphical user interfaces have been described with respect to FIGS. 4A-13. In other implementations consistent with the principles of the invention, the graphical user interfaces may include more, fewer, or different pieces of information.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No, element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more devices, comprising:
    receiving, by a processor associated with the one or more devices, a search query;
    identifying, by the processor, documents based on the search query;
    generating, by the processor, a search result document that includes a list including information regarding a plurality of the identified documents, the search result document including, for one of the identified documents in the list:
        an image associated with the one of the identified documents,
        an excerpt from the one of the identified documents that is associated with the search query, and
        a plurality of links to other excerpts, in the one of the identified documents, that are associated with the search query;
    receiving, by the processor, a selection associated with the one of the identified documents; and
    providing, by the processor, a reference page associated with the one of the identified documents based on receiving the selection associated with the one of the identified documents, the reference page including:
        a plurality of excerpt images from the one of the identified documents, and
        information regarding web documents associated with the one of the identified documents.

2. The method of claim 1, where the image corresponds to a front cover associated with the one of the identified documents.

3. The method of claim 2, where the image includes a thumbnail version of the front cover associated with the one of the identified documents.

4. The method of claim 1, where the search result document further includes for the one of the identified documents:
    a title associated with the one of the identified documents, and
    information regarding an author of the one of the identified documents.

5. The method of claim 1, where the excerpt includes a plurality of words, at least one of the words being visually distinguished with regard to at least one other one of the words.

6. The method of claim 1, where the reference page further comprises:
    a set of links to portions of the one of the identified documents.

7. The method of claim 6, where the set of links reference at least one of:
    a front cover associated with the one of the identified documents,
    a table of contents associated with the one of the identified documents,
    an index associated with the one of the identified documents, or a back cover associated with the one of the identified documents.

8. The method of claim 1, where the reference page further comprises:
a set of links to portions of the one of the identified documents, and
at least one of:
a description of a content of the one of the identified documents,
text associated with one of a jacket, cover, or flap associated with the one of the identified documents,
bibliographic information associated with the one of the identified documents, or
an advertisement.

9. The method of claim 1, further comprising:
providing an excerpt page associated with the one of the identified documents, the excerpt page comprising:
a page excerpt associated with the one of the identified documents and the search query, and
at least one of:
a link to a next or previous page excerpt in the one of the identified documents that is associated with the search query, or
a link to all page excerpts in the one of the identified documents that are associated with the search query.

10. The method of claim 9, where the page excerpt includes a page of the one of the identified documents.

11. The method of claim 9, where the excerpt page further comprises at least one of:
an image associated with the one of the identified documents,
a set of links to portions of the one of the identified documents, or
an advertisement.

12. The method of claim 11, where the set of links reference at least one of:
a reference page associated with the one of the identified documents,
a copyright page associated with the one of the identified documents,
a table of contents associated with the one of the identified documents, or
an index associated with the one of the identified documents.

13. The method of claim 1, further comprising:
providing information associated with a plurality of pages in the one of the identified documents.

14. The method of claim 13, where the information associated with one of the pages comprises:
a portion of text from the page, and
an image of the page.

15. The method of claim 14, where the image of the page includes an indicator that identifies where on the page the portion of text occurs.

16. The method of claim 13, where the information associated with a plurality of pages comprises images of the pages.

17. The method of claim 1, further comprising:
generating information associated with a plurality of previously accessed pages of the one of the identified documents; and
providing the information associated with the plurality of previously accessed pages.

18. The method of claim 17, where the information associated with one of the previously accessed pages comprises a portion of text from the previously accessed page.

19. The method of claim 17, where the information associated with one of the previously accessed pages comprises:
a portion of text from the previously accessed page, and
an image of the previously accessed page.

20. The method of claim 19, where the image of the previously accessed page includes an indicator that identifies where on the previously accessed page the portion of text occurs.

21. The method of claim 17, where the information associated with the plurality of previously accessed pages comprises images of the previously accessed pages.

22. The method of claim 1, further comprising:
providing information associated with a plurality of previously accessed pages, at least one of the previously accessed pages being associated with the one of the identified documents and at least one other of the previously accessed pages being associated with another one of the identified documents.

23. The method of claim 22, where the information associated with one of the previously accessed pages comprises a portion of text from the previously accessed page.

24. The method of claim 22, where the information associated with a plurality of previously accessed pages comprises images of the previously accessed pages.

25. The method of claim 1, where the information regarding web documents associated with the one of the identified documents includes at least one of:
information relating to web documents with a review of the one of the identified documents,
information relating to web documents with a biography of the author,
images related to the author,
news articles related to the one of the identified documents, or
information relating to products related to the one of the identified documents.

26. A system, comprising:
a computer-readable memory device that includes instructions for implementing a graphical user interface comprising:
a page of a document, the page including a search term;
a set of first links to portions of the document;
a second link to a next or previous page of the document that includes the search term, selection of the second link causing a next or previous sequential page of the document to be presented when the next or previous sequential page includes the search term or a page that is not the next or previous sequential page of the document to be presented when the next or previous sequential page does not include the search term; and
a third link to all pages of the document that include the search term, selection of the third link causing images of the pages to be presented.

27. The system of claim 26, where the graphical user interface further comprises:
an image of a front cover associated with the document.

28. The system of claim 26, where the set of links reference a copyright page associated with the document, a table of contents associated with the document, and an index associated with the document.

* * * * *